US006868590B2

(12) United States Patent  
Bentrim

(10) Patent No.: US 6,868,590 B2
(45) Date of Patent: Mar. 22, 2005

(54) QUICK-TURN PANEL FASTENER

(75) Inventor: Brian G. Bentrim, Hatfield, PA (US)

(73) Assignee: PEM Management, Inc., Wilmington, DE (US)

( * ) Notice: Subject to any disclaimer, the term of this patent is extended or adjusted under 35 U.S.C. 154(b) by 0 days.

(21) Appl. No.: 10/469,742
(22) PCT Filed: May 14, 2002
(86) PCT No.: PCT/US02/15179
§ 371 (c)(1),
(2), (4) Date: Sep. 4, 2003
(87) PCT Pub. No.: WO02/096234
PCT Pub. Date: Dec. 5, 2002

(65) Prior Publication Data
US 2004/0083586 A1 May 6, 2004

Related U.S. Application Data
(60) Provisional application No. 60/294,013, filed on May 30, 2001.

(51) Int. Cl.[7] .......................... F16B 21/00; A44B 21/00
(52) U.S. Cl. .......................................... 24/458; 411/34
(58) Field of Search .............................. 24/458; 411/34, 411/41, 45; 215/358, 359, 360

(56) References Cited
U.S. PATENT DOCUMENTS

| | | | |
|---|---|---|---|
| 701,117 A | * | 5/1902 | Wintherlick ................ 215/359 |
| 932,948 A | * | 8/1909 | Baxter ....................... 215/359 |
| 2,353,248 A | | 7/1944 | Lamb |
| 2,479,862 A | * | 8/1949 | Payne ........................ 215/359 |
| 2,513,193 A | | 6/1950 | Miller |
| 2,688,894 A | * | 9/1954 | Modrey ...................... 411/34 |
| 2,904,288 A | * | 9/1959 | Krauss et al. ................ 411/34 |
| 3,093,220 A | | 6/1963 | Modrey |
| 3,406,431 A | | 10/1968 | Armstrong et al. |
| 4,236,429 A | | 12/1980 | Dolch |
| 4,405,272 A | | 9/1983 | Wollar |
| 5,028,187 A | | 7/1991 | Sato |
| 5,184,698 A | | 2/1993 | Coffenberry |
| 5,228,815 A | | 7/1993 | Gignac et al. |
| 5,286,152 A | | 2/1994 | Anderson |
| 6,039,523 A | | 3/2000 | Kraus |
| 2004/0076490 A1 | * | 4/2004 | Bentrim ...................... 411/340 |

* cited by examiner

Primary Examiner—Robert J. Sandy
(74) Attorney, Agent, or Firm—Gregory J. Gore

(57) ABSTRACT

A self-contained assembled fastener (11) includes a retainer (15), a through-pin (24) assembled to an over-molded knob (13), a rubber sleeve (17), and an end cap (19). The retainer (15) includes a radially disposed upward-facing cam ramp (26) that cooperates with a like cam ramp (29) on the knob (13) affixed to the pin (24). To secure two panels (12, 14) the retainer base is first fastened to a first panel preferably by clinch-type attachment (16) with the center pin extending through the retainer and through the two panels to be attached to the opposite side of the second panel. The rubber sleeve (17) is slidably fitted around the end of the pin (24) and is retained axially by an end cap (19). When the pin is turned, the cam-action between the pin ramp and the retainer ramp withdraws the pin axially upward from the retainer compressing the rubber sleeve and causing it to bulge against the backside of the second panel.

13 Claims, 3 Drawing Sheets

QUICK-TURN PANEL FASTENER

The present application is a 371 of PCT/US02/15179 filed May 14, 2002 related to provisional patent application Ser. No. 60/294,013 entitled "Quick-Turn Rubber Panel Fastener" filed on May 30, 2001, priority from which is hereby claimed.

FIELD OF THE INVENTION

This invention relates to a fastener which enables two panels or boards to be quickly attached or disengaged. More specifically, it relates to a fastener that provides a clamp load through the axial compression and subsequent diametric expansion of a rubber sleeve with actuation which is achieved by turning a center pin less than 360 degrees.

BACKGROUND OF THE INVENTION

There has long been a demand in the art for an effective quick-turn (less than 360 degrees) panel fastener. Quick-turn panel fasteners provide a fastening system to securely join and detach two panels face-to-face quickly and easily. A clamping load is desirable and often provided. There are many variations of fasteners that are designed to achieve these general objectives, however each has specific limitations such as: cost, scope of applications, absence of clamp load, etc. Also, some require that a second component be placed on the support panel or that the parts be assembled when used.

The Southco® company offers a "fractional-turn fastener" that utilizes a rubber sleeve, two cams, and a stud. However, this fastener has the significant drawback that it must be assembled by the end user around the first panel on site when first used. This fastener typically comes in two sets, one on either side of mating panels that attach the panels together. Paneloc Company offers a vibration-resistant reusable BI-FIX™ quarter-turn fastener that requires five components, with different components for different applications. This fastener requires irregular shaped holes in both panels that cannot be quickly drilled and can only be punched with a series of hits and different punches or a special punch. The DZUS fasteners include a stud and a grommet that attach to the first panel, and a spring with two rivets that attach to the second panel. There are several variations of this fastener but each includes unassembled multiple components.

Thus, while there are many variations of quick-turn or quarter-turn fasteners available that solve some of the problems in the art, each still has a number of drawbacks. Therefore, there exists an unfulfilled need for an effective quick-turn fastener that can join two panels quickly and easily without requiring the assembly of multiple parts or complicated preparation of the panels.

SUMMARY OF THE INVENTION

In order to solve the problems of the prior art noted above, the present invention has been devised which provides an assembled fastener that comprises atop side retainer, a through-pin with an over-molded knob, a rubber sleeve, and an end cap. The retainer includes a radially disposed upward-facing cam ramp that cooperates with a like cam ramp affixed to the pin. The retainer base is fastened to a first panel preferably by clinch-type attachment. The center clamp pin extends through the retainer and through aligned circular holes in the two panels to be attached, extending through to the opposite side of the second panel. A rubber sleeve is slidably fitted around the clamp pin and is retained axially by an end cap which is attached to the end of the pin. When the pin is turned, either manually or by a tool, the cam-action between the pin ramp and the retainer ramp withdraws the pin axially upward from the retainer compressing the rubber sleeve between the end cap and the base of the retainer. Due to this compression, the rubber sleeve bulges outwardly and thereby its outer surface applies a clamp load against the backside of the second panel. Thus, the two panels become clamped between the expanded area of the rubber sleeve and the base of the retainer.

More specifically, the applicant has invented a clamp-type fastener for securing together two panels or panels having aligned apertures. The fastener includes a retainer having an axial bore and attachment means on a base of the retainer for rigidly fastening the retainer to a first panel. The retainer further includes integral upward-facing cam means which is concentric with the bore and disposed along a top surface of a cylindrical wall extending upwardly from the base of the retainer. A pin having a head and a shaft extends through the bore and beyond the base of the retainer. The pin is rotatable within the retainer between released and clamped positions. Affixed to the pin is downward-facing force bearing means in engagement with the retainer cam means whereby turning the pin moves the shaft axially with respect to the retainer. A cylindrical elastomeric sleeve is fitted loosely about a portion of the pin shaft which extends beyond the base of the retainer. One end of the sleeve is in abutment with the retainer base and the other end of the sleeve is axially retained by an end cap which is affixed to the distal end of the pin so that when the pin is turned to the clamped position, the sleeve is compressed against the base of the retainer and bulges outwardly. The cam means may further include a plurality of radially extending grooves which cooperate with a protruding detent on the force bearing means to provide a succession of stable, indexed positions at rest when the detent occupies one of the grooves. The cam means and the force bearing means preferably include like, helical cam surfaces. The pin preferably includes an over-molded knob having lobes to make the pin easy to turn by hand. The force bearing means is located along an end wall of the cylindrical cavity on the underside of the knob. A first panel to which the retainer is attached is clamped to a second panel by placing the elastomeric sleeve through a hole in the second panel and turning the knob/pin assembly to the clamped position forcing the second panel against the first panel by the force of the expanded elastomeric sleeve against a backside of the second panel.

It is therefore an object of the present invention to create a quick-turn fastener which provides a clamp load and may be utilized to join two panels over a range of panel thicknesses. It is another object of the invention to provide a quick-turn fastener that is a fully preassembled part. It is a further object of the present invention to provide a quick-turn fastener that is inexpensive and functions through a standard round hole in the panels. It is yet a further object of the present invention to provide a quick-turn fastener that may be operated from one side of the panels only and that is vibration resistant. Other objects and advantages of the invention will be readily apparent to those of skill in the art from the following drawings and description of the preferred embodiment.

DESCRIPTION OF THE PREFERRED EMBODIMENTS

Figure 1:
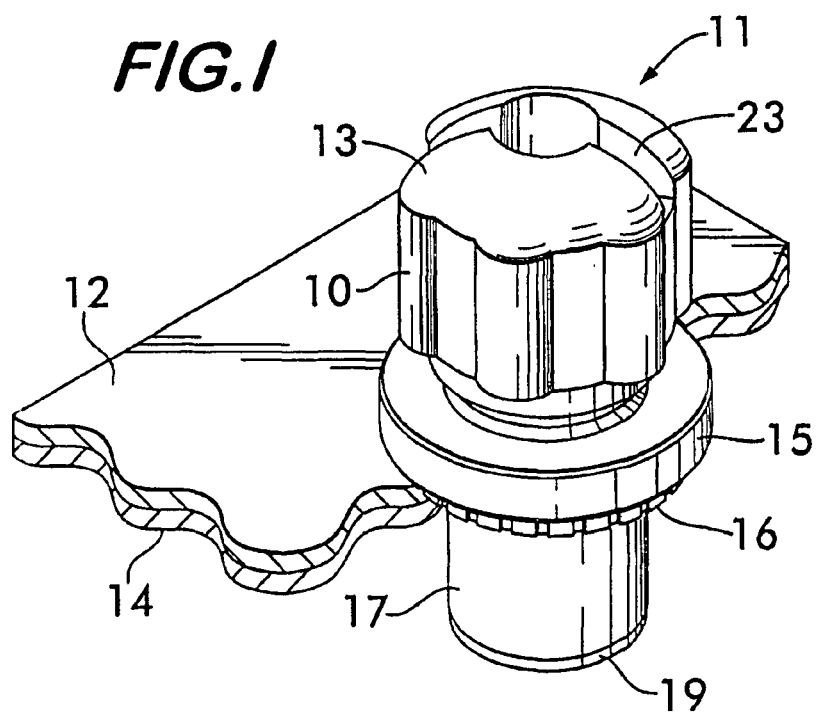
FIG. 1 is a top right front partially sectioned isometric view of the present invention fitted between two panels and in the released position.

Referring now to FIG. 1, the fastener of the present invention 11 is shown installed through two front and rear sheets or panels 12 and 14 respectively. The fastener includes a retainer 15 affixed to the front panel by clinch attachment means 16. An elastomeric sleeve 17 and end cap 19 extend through the opposite side of the rear panel 14. Knob 13 includes manual grip enhancement lobes as well as a tool driving slot for turning the fastener between clamped and released positions.

Figure 2:
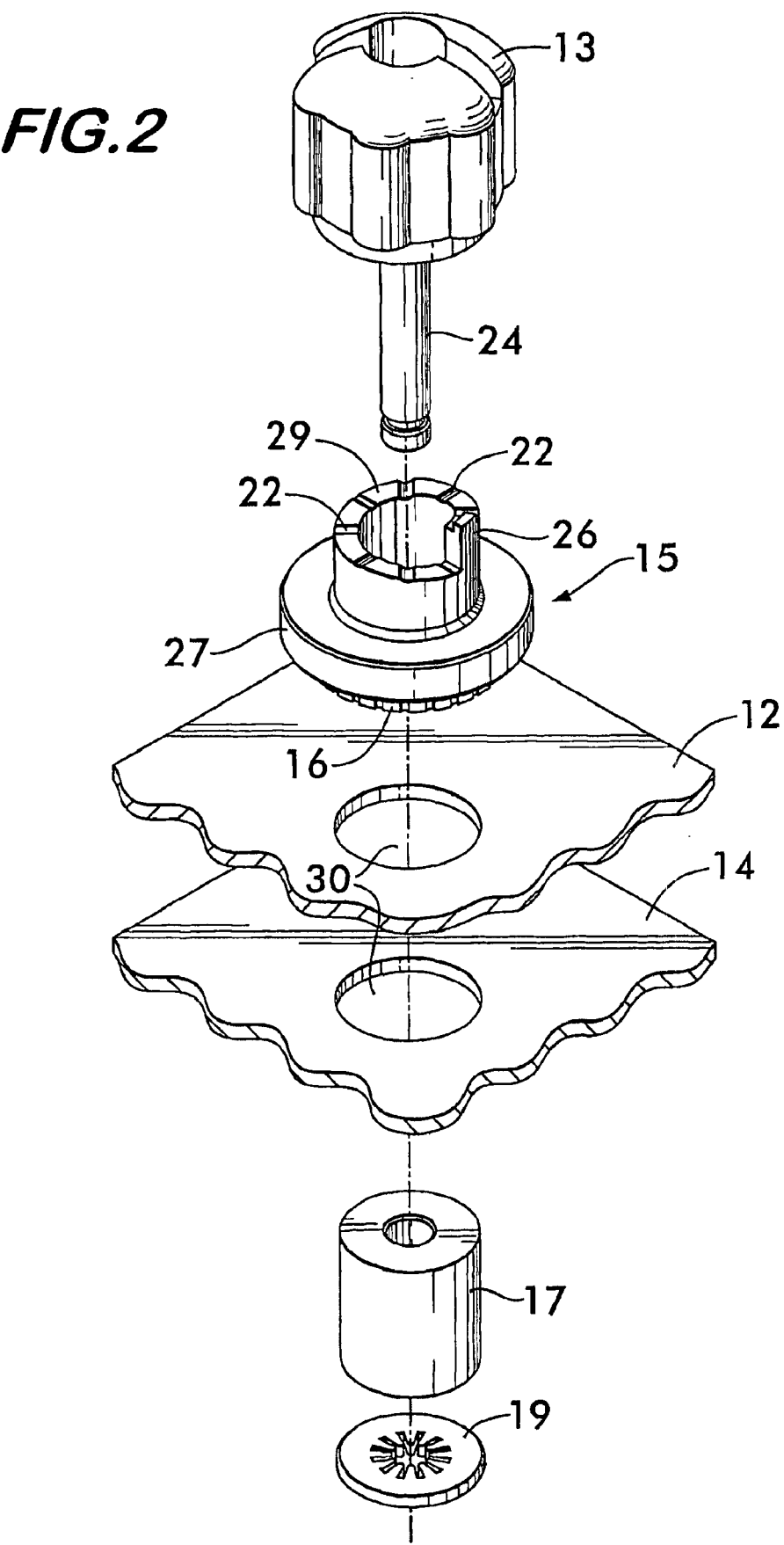
FIG. 2 is a top right front isometric assembly view of the same elements shown in FIG. 1.
Figure 5:
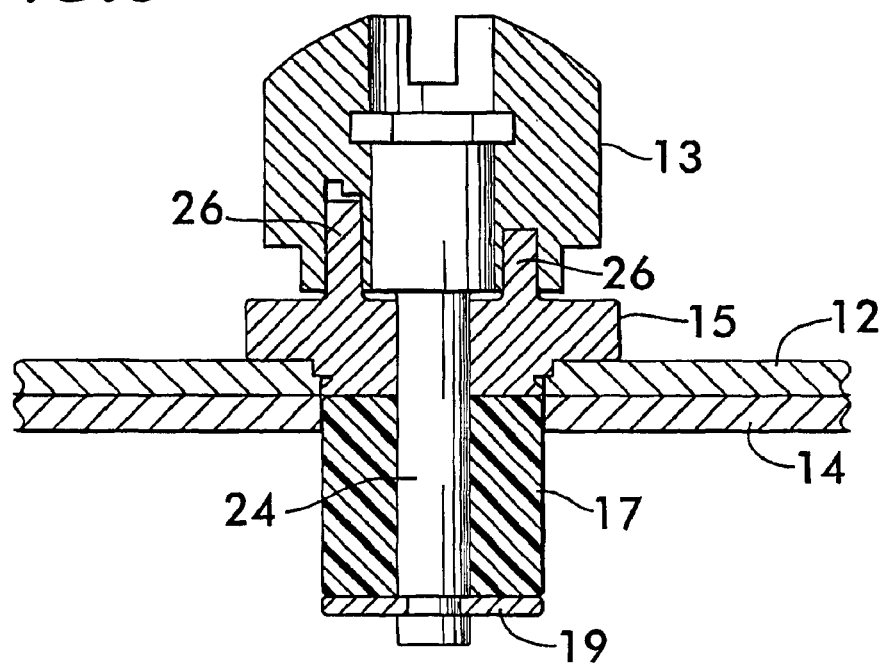
FIG. 5 is a side-sectional view of the assembled components shown in FIG. 1 with the fastener in its released position.
Figure 6:
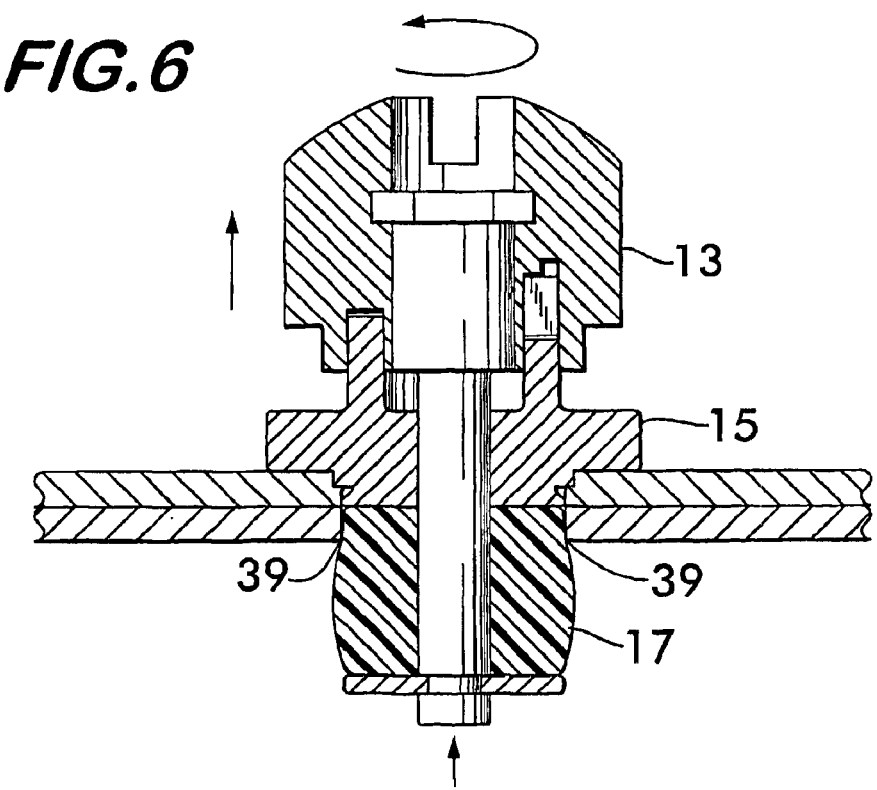
FIG. 6 is the assembly shown in FIG. 5 with the pin assembly rotated in the direction of the arrow to place the fastener in the clamped position.

Referring now to FIG. 2, an exploded view of the assembly shown in FIG. 1 is depicted. The knob 13 is assembled, preferably by over-molding, to a center pin 24 which extends axially through the retainer 15. The retainer 15 includes a cylindrical cam ramp 26 that has a helical cam surface 29 along its top surface which is interrupted by a series of spaced radial grooves 22. As described in more detail below, the grooves 22 provide an indexing mechanism to hold the knob at different rotational positions. As shown in FIGS. 5 and 6, the base of the retainer has a bore which closely receives pin 24, slidably and rotatably. The retainer further includes a flange 27 that abuts front panel 12 when assembled. Clinch means 16 on the retainer beneath the flange permanently affixes the retainer to the front panel. A rubber sleeve 17 is slidably fitted about pin 24 and is axially retained by end cap 19 holding the sleeve snugly against the base of the retainer 15. The fastener requires only simple aligned holes 30 punched or otherwise formed in the front and rear panels.

In operation, the fastener is first attached to the front panel 12 by clinch attachment of the retainer 15 to the top of the front panel. The rear panel 14 is attached to the first panel by passing the end of the fastener containing the elastomeric sleeve through a hole in the second panel. As the panels are held in place, the knob 13 is then turned to the clamped position which compresses the elastomeric sleeve 17 causing it to bulge outwardly against the backside of the rear panel. This forceably clamps the two panels together as more clearly depicted in FIG. 6.

Figure 3:
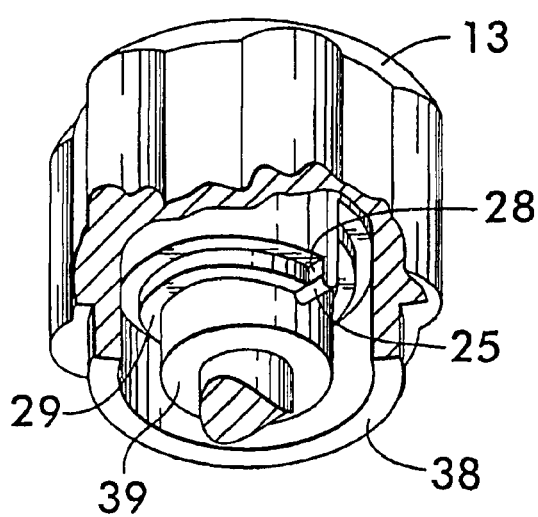
FIG. 3 is a bottom right side partial-cutaway isometric view of the knob and pin assembly.
Figure 4:
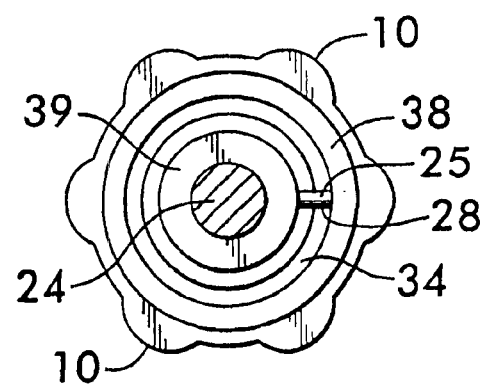
FIG. 4 is a bottom cross-sectional view of the knob and pin assembly.

Referring now to FIGS. 3 and 4, greater detail of the knob/pin assembly is shown. Referring to FIG. 3, the knob 13 includes downward-facing cylindrical outer wall 38 and inner sleeve 39 forming a cylindrical cavity therebetween which is provided with a helical cam ramp 29 along an annular end wall. The end wall includes downward extending detent 25 that provides the force bearing means against the retainer cam ramp to lift the pin upwardly from the retainer as the knob is turned. This cavity closely receives the cylindrical cam ramp of the retainer as more clearly shown in FIGS. 5 and 6. As seen in this figure, the cam ramp is two-tiered to provide structures which closely mate with like surfaces on the retainer to provide a closely-fitting rotatable attachment of parts. The outer tier of the cam ramp includes a stop 28 on a side of detent 25 to prevent the knob from overturning. Referring now to FIG. 4, a bottom view of the knob and pin assembly shows the relationship between the center pin 24 and a two-tiered cam ramp 34 which lies along the end wall of the knob cavity between wall 38 and sleeve 39. The shape of the knob lobes 10 are also shown in this view.

Referring now to FIGS. 5 and 6, the fastener is shown in its released and clamped positions, respectively. Referring to FIG. 5, the knob 13 is shown in close mating relationship with retainer cam ramp 26. In this position, the cam ramps are in full mating relationship along substantially their entire surfaces permitting the application of high force to the knob/pin assembly in order to effect the clinch attachment of the retainer 15 to the front panel 12. The elastomeric sleeve 17 projects through the backside of rear panel 14 and is snugly captured between the base of the retainer 15 and end cap 19. The end cap is axially secured to the pin 24 by a groove adjacent the end of the pin. The knob is preferably composed of plastic and permanently affixed to the head of the pin by over-molding.

These same structures, similarly numbered, are depicted in FIG. 6 however the knob and pin assembly 13 has been rotated counterclockwise relative to the retainer. By the cam action between the detent in the knob bearing against the helical cam ramp in the retainer, the knob/pin assembly is lifted upward as the knob is turned from a released to a clamped position. This forces the pin end cap upward, compressing the elastomeric sleeve 17 against the base of the retainer 15 thus causing an outward bulging of the sleeve. As a result, the deformed sleeve forceably presses against the backside of the rear panel around the circumference 39 of the hole in the rear panel. As more clearly shown in FIG. 2, the retainer cam ramp includes a series of radial grooves which receive the knob detent establishing stable, indexed positions at different points of rotation of the knob. This permits different degrees of clamping force to be applied since the elastomeric sleeve will bulge more or less depending upon how much the knob is turned and the pin is lifted upward.

Thus, the objects of the present invention have been achieved. The fastener disclosed herein is a pre-assembled unit that is easy to use. Furthermore the fastener can be permanently affixed to a panel so that there are no loose parts. It installs into two easily-formed, round holes with no special tooling required to prepare the holes which are simply punched or drilled quickly with standard tooling. Because the rubber is in compression while in use, the fastener will always generate a clamp load. Furthermore, the amount of clamp load is adjustable by how far the pin is turned to successive stable index points. It also has the following additional advantages: it provides a clamp load in a variety of panel thicknesses; it is inexpensive; it can be operated from one side only; and it is vibration resistant.

It should be understood that there may be other modifications and changes to the present invention that will be obvious to those of skill in the art from the foregoing description, however, the present invention should be limited only by the following claims and their legal equivalents.

What is claimed is:

1. A clamp fastener for securing together two panels having aligned apertures, comprising:

a retainer having an axial bore;

attachment means on said retainer for rigidly affixing said retainer to a first planar panel;

upward-facing cam means integral with said retainer, said cam means being concentric with said bore and disposed along a top surface of the retainer;

a pin extending axially through said bore and beyond the retainer, said pin being rotatable within said retainer between clamped and released positions;

downward-facing force bearing means affixed to said pin in engagement with said cam means whereby turning said pin moves said shaft axially with respect to said retainer;

an elastomeric sleeve fitted about a portion of said shaft which extends beyond the base of said retainer, a first end of said sleeve being in abutment with said base; and an end cap secured to said pin adjacent a distal end thereof, said end cap being in abutment with a second end of said sleeve such that when said pin is turned to said clamped position, said sleeve is compressed by said end cap and the sides of said sleeve bulge outwardly against a backside of a second panel holding it to said first panel.

2. The fastener of claim 1 wherein said cam means includes a helical cam surface.

3. The fastener of claim 1 wherein said cam means includes at least one radially extending groove in said helical cam surface and said force bearing means includes an axially protruding detent whereby the pin is held in a rotationally stable position when said detent occupies a groove.

4. The fastener of claim 2 wherein said force bearing means further includes a second helical surface in mating relationship with said first cam helical surface.

5. The fastener of claim 1 wherein said elastomeric sleeve is composed of rubber.

6. The fastener of claim 1 wherein said end cap is rigidly secured to said pin.

7. The fastener of claim 1 wherein said panel attachment means is clinch fastening means.

8. The fastener of claim 1 wherein said pin further includes tool-driving means.

9. The fastener of claim 1 further including a knob composed of plastic and affixed to said pin.

10. The fastener of claim 9 wherein said force bearing means is located along an end wall of a cylindrical cavity on the underside of the knob.

11. The fastener of claim 10 wherein said retainer includes an upward extending cylindrical wall adjacent said cam surface closely fitting within said cavity on the underside of the knob.

12. The fastener of claim 3 wherein said force bearing means is a two-tiered cam ramp including a stop on a side of said detent which engages said upward-facing cam means to prevent the over-turning of said pin.

13. An assembly including the fastener of claim 1 further comprising:

a first panel affixed to said retainer by said attachment means;

a first circular aperture in said first panel greater in diameter than said elastomeric sleeve;

a second panel in face-to-face abutment with a backside of said first panel, said second panel having a second circular hole through which said sleeve extends, said second hole being substantially the same size as said first hole and aligned with said first circular aperture in said first panel; and wherein said elastomeric sleeve is forcibly compressed by said end cap such that the outer surface of said sleeve applies a clamp force against a backside of said second panel when said knob and said pin are turned to said clamped position.

* * * * *